United States Patent [19]

Huang et al.

[11] Patent Number: 5,448,594
[45] Date of Patent: Sep. 5, 1995

[54] ONE BIT DIFFERENTIAL DETECTOR WITH FREQUENCY OFFSET COMPENSATION

[75] Inventors: Yung-Liang Huang, Taipei; Chung H. Lu, Hsinchu Hsien; Ji-Shang Yu; June-Dan Shih, both of Taipei Hsien, all of Taiwan

[73] Assignee: Industrial Technology Research Institute, Chutung, Taiwan

[21] Appl. No.: 6,388

[22] Filed: Jan. 21, 1993

[51] Int. Cl.[6] .................... H04L 27/22; H03D 3/00
[52] U.S. Cl. .................... 375/336; 375/333; 375/340; 329/304
[58] Field of Search .................... 375/83, 87, 80, 90, 375/102, 97, 84, 85; 455/296, 304, 205; 329/300, 302, 304

[56] References Cited

U.S. PATENT DOCUMENTS

| | | | |
|---|---|---|---|
| 4,359,692 | 11/1982 | Ryan | 375/90 |
| 4,466,108 | 8/1984 | Rhodes | 375/83 |
| 4,922,206 | 5/1990 | Nicholas | 329/304 |
| 5,007,068 | 4/1991 | Simon et al. | 375/97 |
| 5,144,256 | 9/1992 | Lim | 375/90 |
| 5,255,290 | 10/1993 | Anvari | 375/83 |
| 5,257,291 | 10/1993 | Desperben et al. | 329/304 |

*Primary Examiner*—Stephen Chin
*Assistant Examiner*—Timothy J. May
*Attorney, Agent, or Firm*—Meltzer, Lippe, Goldstein et al.

[57] ABSTRACT

A one-bit differential detector for a GMSK signal operates independently of an offset frequency. In particular, a decision signal used by a decision circuit to distinguish between logic "0" and logic "1" is always equal to $\sin[\Delta\phi(T)]$. The inventive detector has an improved bit error rate performance in comparison to the prior art.

9 Claims, 3 Drawing Sheets

ONE BIT DIFFERENTIAL DETECTOR WITH FREQUENCY OFFSET COMPENSATION

FIELD OF THE INVENTION

The present invention relates to a detector for use in a communication system using a phase-shift-keying (PSK) modulation scheme.

More particularly, the present invention relates to a one-bit differential detector for a Gaussian baseband filtered minimum shift keying (GMSK) signal which eliminates problems relating to frequency offset.

BACKGROUND OF THE INVENTION

FIG. 1 illustrates a GMSK transmitter. Such a transmitter may be used for mobile communications in Europe in accordance with Digital European Cordless Telecommunications (DECT) standard.

The GMSK transmitter 10 of FIG. 1 comprises a Gaussian Low Pass Filter (LPF) 12 and an FM modulator 14.

The transfer function of the Gaussian LPF is $$h_t(t) = (1/\sqrt{\pi})\alpha_t \exp[-(\alpha_t t)^2]$$

$$\alpha_t = 2\sqrt{2\pi}\, B_{tn} = 2\sqrt{2\pi}\, KB_t$$

$$K = (1/2)\sqrt{(\pi/\ln 2)} = 1.0645$$

$B_t$ denotes the Gaussian Lowpass Filter (LPF) bandwidth which is illustratively 3 dB.

B is the cutoff frequency of the Gaussian filter and T is the data symbol time. Illustratively, BT=0.5

$B_{tn}$ is the equivalent noise bandwidth.

K is the transformation coefficient which relates $B_t$ to $B_{tn}$ and is often considered to be one.

The Gaussian LPF filter 12 receives a Non-Return-to-Zero (NRZ) signal at its input. The output of the filter 12 is a baseband signal of frequency $f_b$ equal to 1.152 MHz. The baseband signal is inputted to the modulator 14. The FM modulator 14 is a minimum shift keying (GMSK) modulator. The output signal of the modulator 14 is a GMSK signal. The GMSK signal is in the intermediate band and has a frequency $f_{IF}=4f_b$.

A prior art detector 20 for a GMSK signal is illustrated in FIG. 2. The GMSK signal enters the intermediate band filter 22 with transfer function $H_r(t)$. The output signal of the filter 22 is $$x(t)=\cos[\omega_{IF}t+\phi(t)]$$

In the signal x(t), $\omega_{IP}=2\pi f_{IF}$. The phase is $\phi(t)$. The filter 22 serves to band limit the signal x(t) and normalizes the envelope of x(t) to unity for all t. The phase $\phi(t)$ contains the information.

The detector 20 comprises the one unit delay 24, the 90° phase shifter 26, and the multiplier 28. The multiplier 28 receives the signal x(t) directly, via path 29, and via path 30, which includes the delay 24 and phase shifter 26. The output of the multiplier 28 is connected to the zonal LPF 32. The output of the zonal LPF 32 is $$y(t)=\sin[\Delta\phi(T)]$$

where $\Delta\phi(T)=\phi(t)-\phi(t-T)$. Thus $\Delta\phi(T)$ represents the change in phase of the signal x(t) over a one symbol time interval. The function $\sin[\Delta\phi(T)]$ represents the sine of the change of phase of the signal x(t) over a one symbol time interval.

The output of the zonal LPF 32 goes to a decision circuit 34. The decision circuit outputs logic 1's and 0's according to the decision rule

| | |
|---|---|
| $\sin[\Delta\phi(T)] > 0$ | output logic 1 |
| $\sin[\Delta\phi(T)] < 0$ | output logic 0 |

A transmitter and a detector for GMSK signals such as the transmitter 10 of FIG. 1 and the detector 20 of FIG. 2 is disclosed in Marvin K. Simon et al., "Differential Detection of Gaussian MSK in a Mobile Radio Environment" IEEE Transactions on Vehicular Technology, Vol. VT-33 No. November 1984, page 307.

One problem with the detector 20 of FIG. 2 is that an offset frequency will degrade the bit error rate performance. However, in the DECT standard an offset of ±50 kHz is acceptable.

If $\omega_{IF}=8\pi f_b+\Delta\omega=8\pi f_b+2\pi\Delta f$, where $\Delta f$ is the frequency offset, then the output of the zonal filter 32 is $$y(t)=\sin[2\pi\Delta f/f_b+\Delta\phi(T)].$$

The signal y(t) is now the sine of the change in phase of the signal x(t) over a one symbol time interval plus a frequency offset term.

Thus, the signal used by the decision circuit 34 to decide between logic "1" and logic "0" is distorted due to the frequency offset. This distortion will degrade the bit error rate performance of the detector.

In view of the foregoing, it is an object of the present invention to provide a one bit differential detector for a GMSK signal which eliminates the distortion caused by frequency offset. More particularly, it is an object of the present invention to modify the detector circuit 20 of FIG. 2 to eliminate the dependence on the offset frequency of the output of the zonal filter 32.

SUMMARY OF THE INVENTION

In accordance with the present invention, a one bit differential detector for a GMSK signal which is independent of any offset frequency is provided. In particular, a decision signal used by a decision circuit to decide between logic "0" and logic "1" is always proportional to $\sin[\Delta\phi(T)]$ independently of the presence of any offset frequency. The inventive detector has an improved bit error rate performance in comparison to the prior art.

DETAILED DESCRIPTION OF THE INVNETION

Figure 1:
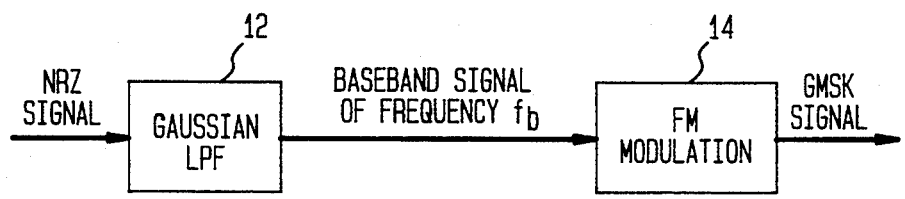
FIG. 1 schematically illustrates a prior art GMSK transmitter.
Figure 2:
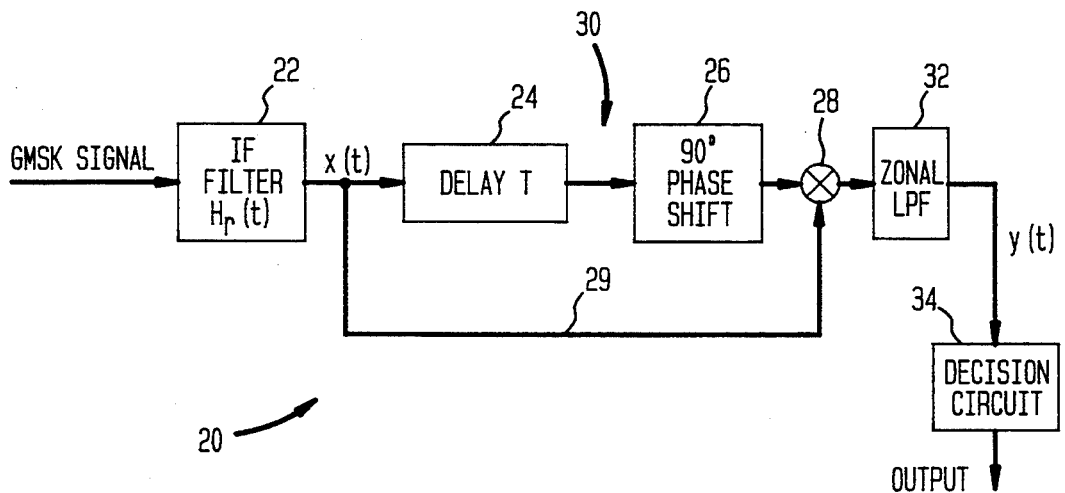
FIG. 2 schematically illustrates a prior art GMSK detector.
Figure 3:
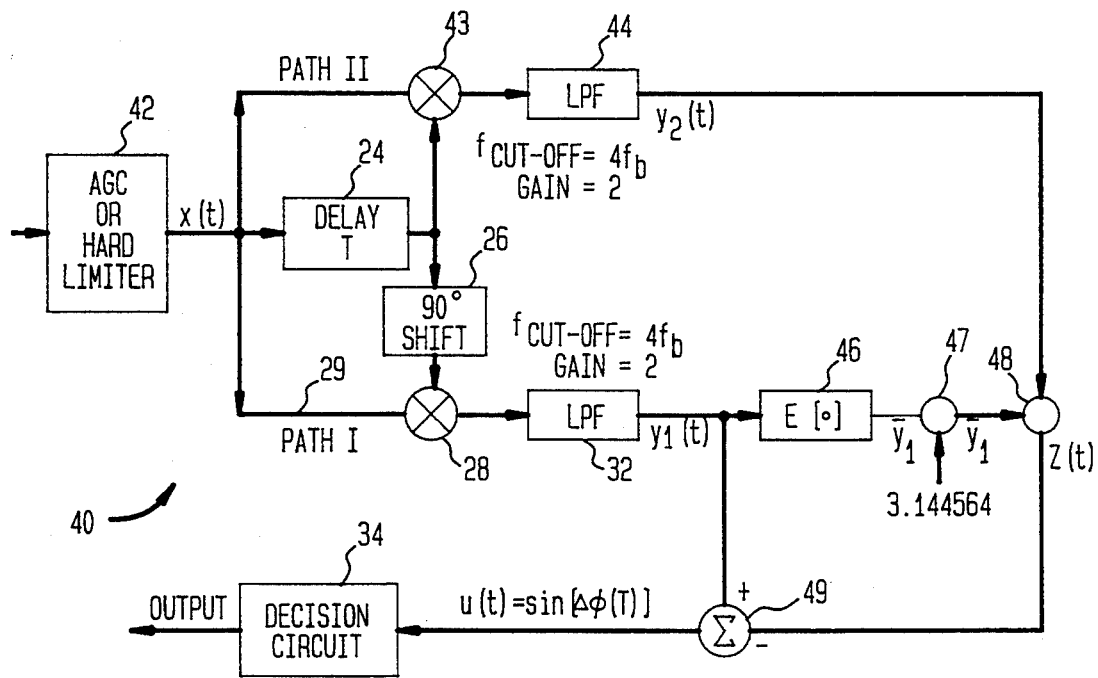
FIG. 3 schematically illustrates an improved GMSK detector according to the invention.

A one bit differential detector for a GMSK signal which is independent of a frequency offset is illustrated in FIG. 3. In the detector 40 of FIG. 3, a GMSK signal arrives at an Automatic Gain Control (AGC) device or hard limiter 42 which outputs the signal x(t). As in the case of the prior art detector 20 of FIG. 2, the signal x(t) is bandwidth limited and has a normalized envelope for all t.

The detector 40 has two paths. The path I is identical to the processing path of the prior art detector 20 of FIG. 2 and comprises the unit delay 24, the 90° degree phase shifter 26, the multiplier 28 and the low pass filter 32. The multiplier 28 receives the signal x(t) directly and via the delay 24 and 90° phase shifter 26. The output of the low pass filter 32 is the signal $$y_1 = \sin[2\pi \Delta f/f_b + \Delta\phi(T)]$$

As indicated above, the signal $Y_1$ is equal to the sine of the change in phase of the signal x(t) for one symbol time interval plus a frequency offset term. Note that the cutoff frequency $f_{cut-off}$ of the filter 32 of FIG. 3 is $4f_b$ and the gain is 2.

Path II and the rest of the circuitry has been added to the detector 40 of FIG. 3 to eliminate the frequency offset term from the signal $y_1$. Thus, the overall output signal which is then inputted to the decision circuit 34 is $$u(t) = \sin[\Delta\phi(T)]$$

As can be seen, the frequency offset term has been eliminated from this signal.

The path II includes the unit delay 24, the multiplier 43 and the low pass filter (LPF) 44. The filter 44 has a cut-off frequency $f_{cut-off} = 4f_b$ and a gain of 2. The inputs to the multiplier 43 are the signal x(t) and the signal x(t) as delayed by the unit delay 24. The output of the multiplier 43 is inputted to the filter 44. The output of the filter 44 is $$y_2(t) = \cos[2\pi \Delta f/f_b + \Delta\phi(T)]$$

The signal $y_2$ is equal to the cosine of the change of phase of the signal x(t) in one symbol time interval plus a frequency offset term.

Thus, to summarize the discussion thus far, the following signals have been considered $$x(t) = \cos[\omega_{IF} t + \phi(t)], \; \omega_{IF} = 8\pi f_b + 2\pi \Delta f$$

$$y_1(t) = \sin[2\pi \Delta f/f_b + \Delta\phi(T)]$$

$$y_2(t) = \cos[2\pi \Delta f/f_b + \Delta\phi(T)]$$

Using the approximation $\Delta f/f_b$ is small, the expression for the signal $y_1$ becomes $$y_1(t) = (2\pi\Delta f/f_b)\cos[\Delta\phi(T)] + \sin[\Delta\phi(T)]$$

The filter 46 is now used to calculate $\bar{y}_1 = E[y_1(t)]$, where E is the expectation value, i.e., longterm average. The expectation value $E[y_1(t)]$ is evaluated as follows:

$$\bar{y}_1 = E[y_1(t)] = (2\pi\Delta f/f_b) E[\cos[\Delta\phi(T)]] + E[\sin[\Delta\phi(T)]]$$

For one bit differential detection $$\Delta\phi(T) = \Delta\phi_k = b_{k-1}\phi_{-1} + b_k\phi_o + b_{k+1}\phi_1$$

The following chart corresponds total possible combinations for BT=0.5.

| Coefficient Combination | | | |
|---|---|---|---|
| $b_{k-1}$ | $b_k$ | $b_{k+1}$ | $\Delta\phi(T)$ |
| 1 | 1 | 1 | 90° |
| −1 | 1 | 1 | 73.7° |
| 1 | 1 | −1 | 68.1° |
| −1 | 1 | −1 | 51.8° |
| 1 | −1 | 1 | −51.8 |
| −1 | −1 | 1 | −68.1° |
| 1 | −1 | −1 | −73.7° |
| −1 | −1 | −1 | −90° |

Note that the first four entrees of the chart correspond to $b_k=1$ and the last four entrees correspond to $b_k=-1$.

To evaluate $E[\cos[\Delta\phi(T)]]$ and $E[\sin[\Delta\phi(T)]]$, it is assumed that all combinations are equally likely. Thus, because $\sin[\Delta\phi(T)]$ is an odd function, $E[\sin[\Delta\phi(T)]]=0$. The function $\cos[\phi(T)]$ is an even function so that $$E[\cos[\Delta\phi(T)]] = [\cos 90° + \cos 73.7° + \cos 68.1° + \cos 51.8°](\tfrac{1}{4}) = 0.318.$$

Thus, the signal at the output of the filter 46 is $$\bar{y}_1 = (2\pi\Delta f/f_b)(0.318).$$

The multiplier 47 multiplies $\bar{y}_1$ by (1/0.318) to obtain the signal $$y_1 = 2\pi\Delta f/f_b.$$

The multiplier 48 multiplies $y_2(t)$ by $y_1$ to obtain $$z(t) = y_2(t)y_1 \sim (2\pi\Delta f/f_b) \cos[\Delta\phi(T)].$$

Then the subtraction element 49 obtains $$u(t) = y_1(t) - z(t) = \sin[\Delta\phi(T)]$$

as desired.

The signal u(t) is then inputted into the decision circuit 34 which decides between logic "1" and logic "0".

Figure 4:
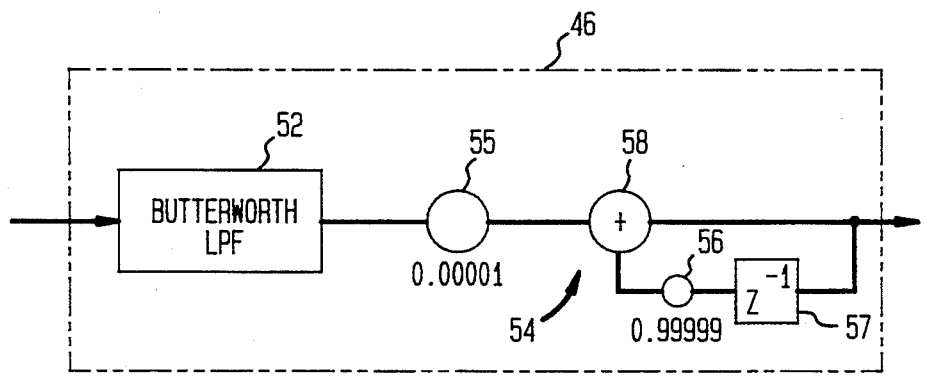
FIG. 4 illustrates a filter for determining an expectation value for use in the detector of FIG. 3.

The low pass filter 44 of FIG. 3 for determining $E[y_1(t)]$ is illustrated in greater detail in FIG. 4.

The filter 46 of FIG. 4 comprises a Butterworth low pass filter 52 and a low pass filter 54. The lowpass filter 54 comprises the weighting elements 55 and 56, the unit delay 57 and the adder 58.

The transfer function of the Butterworth filter is $$\frac{1 + 2z^{-1} + z^{-2}}{1 - 1.993692172z^{-1} + 0.9937315894 Z^{-2}}.$$

$$\frac{1 + z^{-1}}{1 - 0.9937315276 z^{-1}}$$

The transfer function for the lowpass filter is $$\frac{0.00001}{1 - 0.99999z^{-1}}$$

Figure 5:
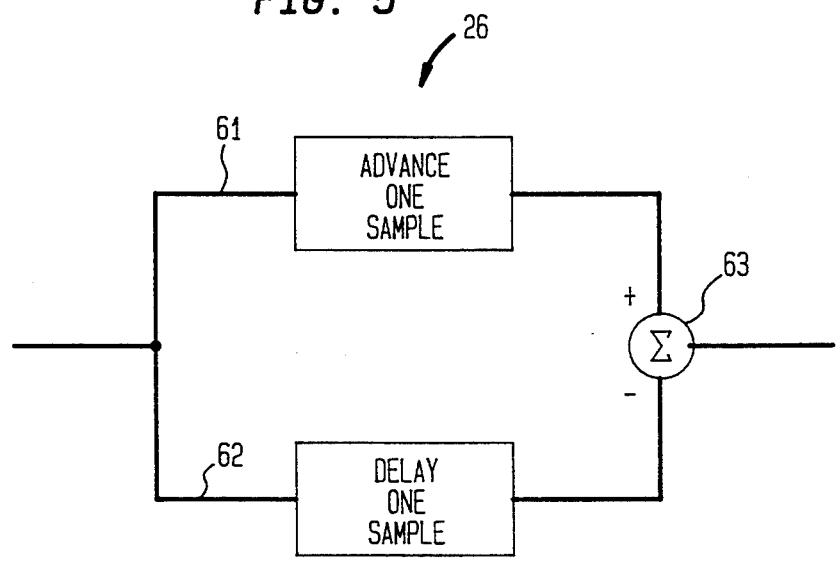
FIG. 5 illustrates a 90° phase shifter for use in the detector of FIG. 3.

The 90° phase shifter 26 may be implemented as shown in FIG. 5. The phase shifter 26 comprises two paths 61 and 62. In the path 61 the signal is advanced one sample, in path 62 the signal is delayed one sample, then the signals are combined using the summer 63.

Figure 6:
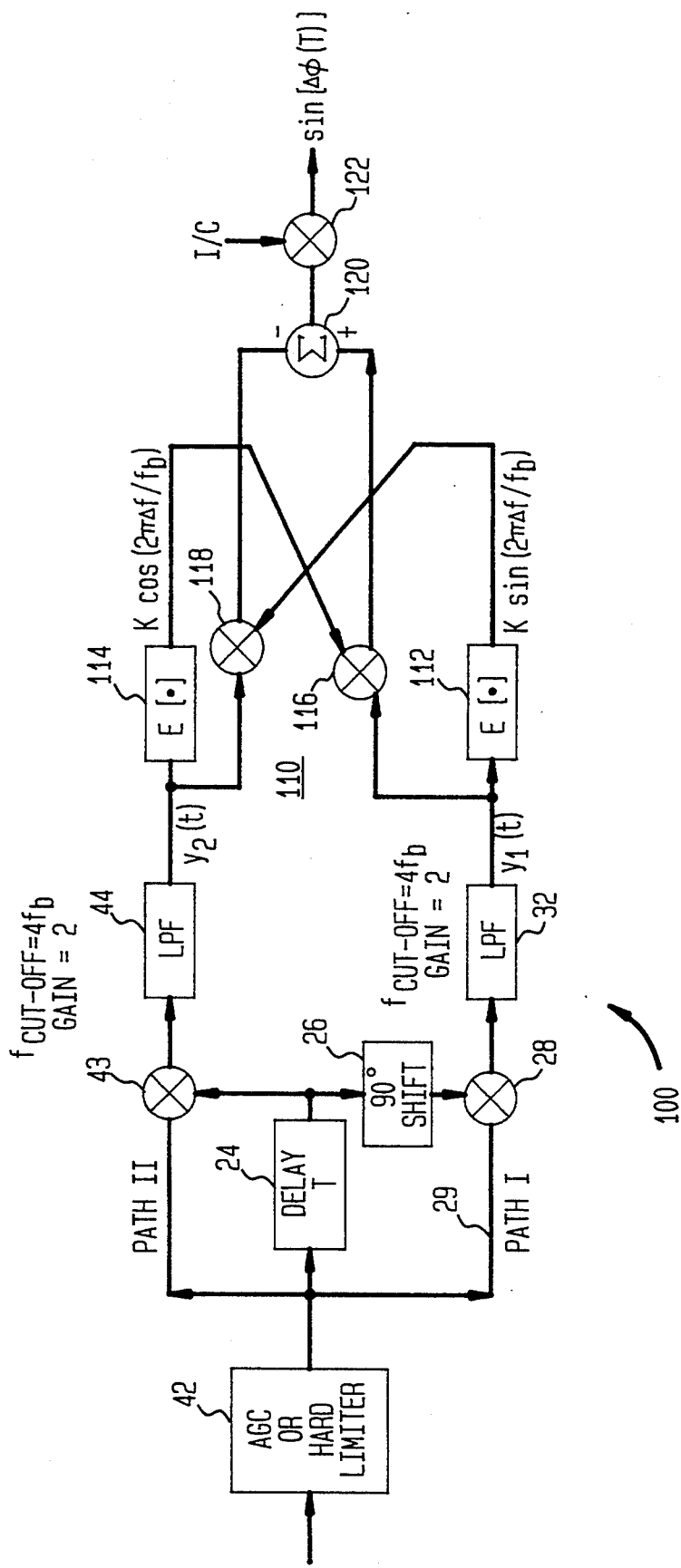
FIG. 6 illustrates an alternate improved GMSK detector according to the invention.

An alternative one bit differential GMSK detector which eliminates the influence of an offset frequency is illustrated in FIG. 6. The detector 100 of FIG. 6 does not rely on the assumption that $\Delta f/f_b$ is small.

The detector 100 includes the same path I and path II as the detector 40 of FIG. 3. Thus, the filter 32 of path I outputs $$y_1(t) = \sin[2\pi\Delta f/f_b + \Delta\phi(T)]$$

The filter 44 of path II outputs $$y_2(t) = \cos[2\pi\Delta f/f_b + \Delta\phi(T)]$$

It can be shown that $$\sin[\Delta\phi(T)] = -\sin[2\pi\Delta f/f_b]y_1(t) + \cos[2\pi\Delta f/f_b]y_2(t).$$

The processing circuitry 110 performs this calculation. More specifically, to perform the calculation, the circuitry 110 includes the filter 112 for performing $E[y_1]$ where $$E[y_1] = \sin(2\pi\Delta f/f_b)E[\cos\Delta\phi(T)] = C\sin(2\pi\Delta f/f_b)$$

The filter 114 performs $E[y_2]$ where $$E[y_2] = \cos(2\pi\Delta f/f_b)E[\cos\Delta\phi(T)] = C\cos(2\pi\Delta f/f_b)$$

where C is a predetermined constant equal to 0.318 for the case BT=0.5.

The multipliers 116 and 118 perform $y_1E[y_2]$ and $y_2[y_1]$, respectively. The results are then subtracted using the subtraction element 120 and multiplied by (1/C) in the multiplier 122 to obtain the desired output result.

To summarize, a one bit differential GMSK detector has been disclosed. The inventive detector eliminates the distortions caused by offset frequency to improve the bit error rate performance. Finally, the above-described embodiments of the invention are intended to be illustrative only. Numerous alternative embodiments may be devised by those skilled in the art without departing from the scope of the following claims.

We claim:

1. A one bit differential detector for a GMSK signal of the form $x(t) = \cos(\omega_{IF}t + \phi(t))$ wherein $\omega_{IF} = 2\pi(f_{IF} + \Delta f)$, $f_{IF}$ is an intermediate frequency of x(t), $\Delta f$ is a frequency offset of $f_{IF}$, and $\phi(t)$ is a phase, said detector comprising:

a first signal processing path for outputting a signal $y_1 = \sin(2\pi\Delta f/f_b + \Delta\phi(T))$, where $f_b$ is a baseband signal frequency and $\Delta f$ is small compared to $f_b$, and $\Delta\phi(T)$ is a change in phase of x(t) over a one symbol time period, and which signal $y_2$ is proportional to the sine of a change of phase of the signal x(t) over a one-symbol time interval plus a frequency offset term, a second signal processing path for outputting signal $y_2 = \cos(2\pi\Delta f/f_b + \Delta\phi(T))$, which signal $y_2$ is proportional to the cosine of the change of phase of the signal x(t) over a one symbol time interval plus a frequency offset term, and signal processing means connected to said first and second signal processing paths and being connected to receive said signals $y_1$ and $y_2$ and configured to output an output signal $u(t) = \sin(\Delta\Phi(T))$, which output signal is proportional to the sine of the change of phase of the signal x(t) over one symbol time interval and independent of said frequency offset, said signal processing means comprising:

(a) means for generating a proportional to said frequency offset term of said signal $y_1$, wherein the signal proportional to said frequency offset term of said signal $y_1$ equals z(t) and z(t) being approximated as equal to $(2\pi\Delta f/f_b)\cos(\Delta\Phi(T))$ (b) means for subtracting said signal proportional to said frequency offset from said signal $y_1$ to generate said output signal u(t).

2. The detector of claim 1 wherein said first signal processing path comprises, a one period delay unit for receiving said signal x(t), a 90° phase shifter connected to said one period delay unit having an output signal $x_1(t)$, a multiplier for directly receiving said signal x(t) and for receiving said output signal $x_1(t)$ of said phase shifter wherein said multiplier has an output signal $x(t)*x_1(t) = \sin(\omega_{IF}T + \Delta\phi(T))$, and a low pass filter connected to an output of said multiplier for receiving said output signal $x(t)*x_1(t)$ of said multiplier and for outputting said signal $y_1$.

3. The detector of claim 1 wherein said second signal processing path comprises:

a one period delay unit for receiving said signal x(t), a multiplier connected to receive said signal x(t) directly and to receive an out of the one period delay unit, and a low pass filter connected to an output of said multiplier for outputting said signal $y_2$.

4. The detector of claim 1 further comprising a decision circuit for receiving said output signal u(t) from said signal processing means and for generating logic 1's and logic 0's in response thereto.

5. The detector of claim 1 wherein said means for generating said signal proportional to the frequency offset term of the signal $y_1$ comprises a filter for obtaining an expectation value of the signal $y_1$.

6. The detector of claim 5, wherein said means for generating said signal proportional to the frequency offset term of the signal $y_1$ further comprises:

a first multiplier for multiplying the expectations value by a constant factor, and a second multiplier for multiplying the signal $y_2$, by an output of the first multiplier for generating said signal proportional to said frequency offset term.

7. The detector of claim 1, wherein said signal processing means comprises:

first and second filters for obtaining the expectation values of $E(y_1)$ and $E(y_2)$ of said signals $y_1$ and $y_2$, a first multiplier for multiplying $y_1$ and $E(y_2)$ a second multiplier for multiplying $y_2$ and $E(y_1)$, and a subtractor for obtaining the difference of an output from said first multiplier and the output from said second multiplier.

8. A one bit differential detector for a GMSK signal of the form $x(t)=\cos(\omega_{IF}t+\phi(t))$ where $\omega_{IF}=2\pi(f_{IF}+\Delta f)$, $f_{IF}$ is a frequency, $\Delta f$ is a frequency offset, and $\phi(t)$ is a phase, said detector comprising:

a first signal processing path for outputting a signal $y_1=\sin(2\pi\Delta f/f_b+\Delta\phi(T))$, where $f_b$ is a baseband signal frequency and which signal $y_1$ is proportional to the sine of the change of phase of the signal $x(t)$ over a one-symbol time interval plus a frequency offset term, a second signal processing path for outputting a signal $y_2=\cos(2\pi\Delta f/f_b+\Delta\phi(T))$, which signal $y_2$ is proportional to the cosine of the change of phase of the signal $x(t)$ over a one symbol time interval plus a frequency offset term, signal processing means connected to said first and second signal processing paths for receiving said signals $y_1$ and $y_2$ and outputting an output signal $u(t)=\sin(\Delta\phi(T))$, which output signal is proportional to the sine of the change of phase of the signal $x(t)$ over one symbol time interval and independent of said frequency offset, wherein said offset frequency $\Delta f$ is small compared to the baseband signal frequency $f_b$, and said signal processing means comprises means for generating a signal $z(t)$ which is proportional to said frequency offset term of said signal $y_1$, and $z(t)$ being approximated as equal to $(2\pi\Delta f/f_b)\cos(\Delta\phi(T))$ and means for subtracting said signal proportional to said frequency offset term from said signal $y_1$ to generate said output signal $u(t)$, wherein said means for generating comprises a filter for obtaining an expectation value of the signal $y_2$.

9. A one bit differential detector for GMSK signal of the form $x(t)=\cos(\omega_{IF}t+\phi(t))$ where $\omega_{IF}=2\pi(f_{IF}+\Delta f)$, $f_{IF}$ is a frequency, $\Delta f$ is a frequency offset, and $\phi(t)$ is a phase, said detector comprising:

a first signal processing path for outputting a signal $y_1=\sin(2\pi\Delta f/f_b+\Delta\phi(T))$, where $f_b$ is a baseband signal frequency and which signal $y_1$ is proportional to the sine of the change of phase of the signal $x(t)$ over a one-symbol time interval plus a frequency offset term, a second signal processing path for outputting a signal $y_2=\cos(2\pi\Delta f/f_b+\Delta\phi(T))$, which signal $y_2$ is proportional to the cosine of the change of phase of the signal $x(t)$ over a one symbol time interval plus a frequency offset term, signal processing means connected to said first and second signal processing paths for receiving said signals $y_1$ and $y_2$ and outputting an output signal $u(t)=\sin(\Delta\phi(T))$, which output signal is proportional to the sine of the change of phase of the signal $x(t)$ over one symbol time interval and independent of said frequency offset, and wherein said signal processing means comprises first and second filters for obtaining the expectation values of $E(y_1)$ and $E(y_2)$ of said signals $y_1$ and $y_2$, a first multiplier for multiplying $y_1$ and $E(y_2)$, a second multiplier for multiplying $y_2$ and $E(y_1)$, and a subtractor for obtaining the difference of an output from said first multiplier and an output from said second multiplier.

* * * * *